United States Patent
Fang et al.

(10) Patent No.: US 12,026,403 B1
(45) Date of Patent: Jul. 2, 2024

(54) METHOD AND APPARATUS FOR PERFORMING CONFIGURATION MANAGEMENT OF MEMORY DEVICE IN PREDETERMINED COMMUNICATIONS ARCHITECTURE WITH AID OF ELECTRONIC FUSE DATA PREPARATION, AND ASSOCIATED COMPUTER-READABLE MEDIUM

(71) Applicant: Silicon Motion, Inc., Hsinchu County (TW)

(72) Inventors: Hong-Ren Fang, Hsinchu County (TW); Guo-Jhang Hong, Taichung (TW); Lu-Ting Wu, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 44 days.

(21) Appl. No.: 18/092,451

(22) Filed: Jan. 3, 2023

(51) Int. Cl.
*G06F 3/00* (2006.01)
*G06F 3/06* (2006.01)

(52) U.S. Cl.
CPC .......... *G06F 3/0659* (2013.01); *G06F 3/0622* (2013.01); *G06F 3/0632* (2013.01); *G06F 3/0679* (2013.01)

(58) Field of Classification Search
None
See application file for complete search history.

(56) References Cited

U.S. PATENT DOCUMENTS 11,908,535 B2 * 2/2024 Seok .................. G11C 29/52
2022/0317901 A1 10/2022 Nicholson

FOREIGN PATENT DOCUMENTS

| CN | 114761893 A | 7/2022 |
| CN | 115019874 A | 9/2022 |
| TW | I743715 B | 10/2021 |
| TW | 202209118 A | 3/2022 |

* cited by examiner

Primary Examiner — Midys Rojas
(74) Attorney, Agent, or Firm — Winston Hsu (57) ABSTRACT

A method for performing configuration management of a memory device in predetermined communications architecture with aid of electronic fuse (eFuse) data preparation, associated apparatus and computer-readable medium are provided. The method may include: utilizing a memory controller to receive a first command from a host device through a transmission interface circuit of the memory controller; utilizing the memory controller to execute at least one procedure regarding MP initialization of the memory device, for example, operations of a first procedure among the at least one procedure may include obtaining eFuse information from an eFuse circuit, preparing protected eFuse data according to the eFuse information, and storing the protected eFuse data into a non-volatile (NV) memory; and utilizing the memory controller to send a first response to the host device through the transmission interface circuit, wherein the first response is sent to the host device in response to the first command.

20 Claims, 6 Drawing Sheets

METHOD AND APPARATUS FOR PERFORMING CONFIGURATION MANAGEMENT OF MEMORY DEVICE IN PREDETERMINED COMMUNICATIONS ARCHITECTURE WITH AID OF ELECTRONIC FUSE DATA PREPARATION, AND ASSOCIATED COMPUTER-READABLE MEDIUM

BACKGROUND OF THE INVENTION

1. Field of the Invention

The present invention is related to memory control, and more particularly, to a method and apparatus for performing configuration management of a memory device in a predetermined communications architecture with aid of electronic fuse (eFuse) data preparation, and associated computer-readable medium, where examples of the apparatus may comprise the memory device, a controller thereof, an electronic device comprising the memory device, etc.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. For example, multiple one-time programmed bits may be arranged to define different hardware configurations of the memory device, respectively. When a manufacturer of the memory device tries to implement the memory device according to the UFS specification, some problems may occur. More particularly, in a preliminary phase (e.g., a design phase) before a mass production phase of the memory device, a controller integrated circuit (IC) vendor may originally provide a controller IC with multiple one-time programming units such as eFuse units for storing the multiple one-time programmed bits. As loading the multiple one-time programmed bits from the multiple one-time programming units such as the eFuse units is time consuming, when the total bit count of the multiple one-time programmed bits increases, the performance of the memory device that is operating in a user phase of the memory device will be reduced correspondingly, for example, during initialization after a hardware reset or power-up, the memory device may spend too much time on reading the eFuse units, causing the overall performance of any device that is equipped with the memory device to be reduced. In addition, the multiple one-time programmed bits may be correctly read from the eFuse units in a situation where the number of times of reading does not exceed a certain number such as twenty million, but for a much larger number of times of reading, the reliability of the eFuse units may need further proof, which means the multiple one-time programmed bits may not be correctly read from the eFuse units after long-term use. The related art tries to correct the problems, but further problems may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing configuration management of a memory device in a predetermined communications architecture (e.g., a UFS communications architecture) with aid of eFuse data preparation, and an associated computer-readable medium, in order to solve the above-mentioned problems.

At least one embodiment of the present invention provides a method for performing configuration management of a memory device in a predetermined communications architecture with aid of eFuse data preparation, where the method can be applied to a memory controller of the memory device. The memory device may comprise the memory controller and a non-volatile (NV) memory, and the NV memory may comprise at least one NV memory element (e.g., one or more NV memory elements). The method may comprise: during a mass production (MP) phase of the memory device, utilizing the memory controller to receive a first command from a host device through a transmission interface circuit of the memory controller; during the MP phase of the memory device, after receiving the first command from the host device, utilizing the memory controller to execute at least one procedure regarding MP initialization of the memory device, wherein operations of a first procedure among the at least one procedure comprise: obtaining eFuse information from an eFuse circuit within the memory controller; preparing protected eFuse data in a Random Access Memory (RAM) within the memory controller according to the eFuse information; and storing the protected eFuse data into the NV memory, for being used as replacement of the eFuse information in a user phase of the memory device; and during the MP phase of the memory device, after executing the at least one procedure, utilizing the memory controller to send a first response to the host device through the transmission interface circuit, wherein the first response is sent to the host device in response to the first command.

In addition to the above method, the present invention also provides a memory controller of a memory device, where the memory device comprises the memory controller and an NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller, wherein the processing circuit is arranged to perform configuration management of the memory device in a predetermined communications architecture with aid of eFuse data preparation. The memory controller further comprises a transmission interface circuit, and the transmission interface circuit is arranged to perform communications with the host device. For example, during an MP phase of the memory device, the memory controller receives a first command from the host device through the transmission interface circuit of the memory controller; during the MP phase of the memory device, after receiving the first command from the host device, the memory controller executes at least one procedure regarding MP initialization of the memory device, wherein operations of a first procedure among the at least one procedure comprise: obtaining eFuse information from an eFuse circuit within the memory controller; preparing protected eFuse data in a RAM within the memory controller according to the eFuse information; and storing the protected eFuse data into the NV memory, for being used as replacement of the eFuse information in a user phase of the memory device; and during the MP phase of the memory device, after executing the at least one procedure, the memory controller sends a first response to the host device through the transmission interface circuit, wherein the first response is sent to the host device in response to the first command.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

At least one embodiment of the present invention provides a method for performing configuration management of a memory device in a predetermined communications architecture with aid of eFuse data preparation, where the method can be applied to a host device coupled to the memory device. The memory device may comprise a memory controller and an NV memory, and the NV memory may comprise at least one NV memory element (e.g., one or more NV memory elements). The method may comprise: during an MP phase of the memory device, sending a first command from the host device to the memory controller through a transmission interface circuit of the host device, to trigger the memory controller to execute at least one procedure regarding MP initialization of the memory device, wherein operations of a first procedure among the at least one procedure comprise: obtaining eFuse information from an eFuse circuit within the memory controller; preparing protected eFuse data in a RAM within the memory controller according to the eFuse information; and storing the protected eFuse data into the NV memory, for being used as replacement of the eFuse information in a user phase of the memory device; during the MP phase of the memory device, after sending the first command to trigger the memory controller to execute the at least one procedure, waiting for a first response from the memory controller; and during the MP phase of the memory device, receiving the first response from the memory controller through the transmission interface circuit to get the first response, wherein the first response is sent by the memory controller to the host device in response to the first command.

In addition to the method mentioned above, the present invention also provides the host device that operates according to the method, and also provides a computer-readable medium storing a program code which causes the host device to operate according to the method when executed by the host device. For example, the program code may represent a host-side program code such as an MP tool. According to some embodiments, the host device that is running the host-side program code (e.g., the MP tool) may send the first command such as a vendor specific command (e.g., a vendor-defined command) to the memory device, to start running the aforementioned at least one procedure (e.g., an MP initialization procedure and an eFuse handling procedure) regarding the MP initialization on the memory device, in order to perform the configuration management.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the host device. In some examples, the apparatus may comprise the electronic device.

The present invention method and apparatus can guarantee that the memory device can operate properly in various situations. For example, the protected eFuse data has been well prepared in the NV memory during the MP phase of the memory device. During user-phase initialization, such as the initialization after a hardware reset or power-up in the user phase of the memory device, the memory controller can rapidly load the protected eFuse data from the NV memory to the RAM within the memory controller, rather than loading any eFuse information from the eFuse circuit within the memory controller, to complete the user-phase initialization in time, and therefore can guarantee that the memory device can become ready for being used by the host device in a predetermined user-phase initialization time. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
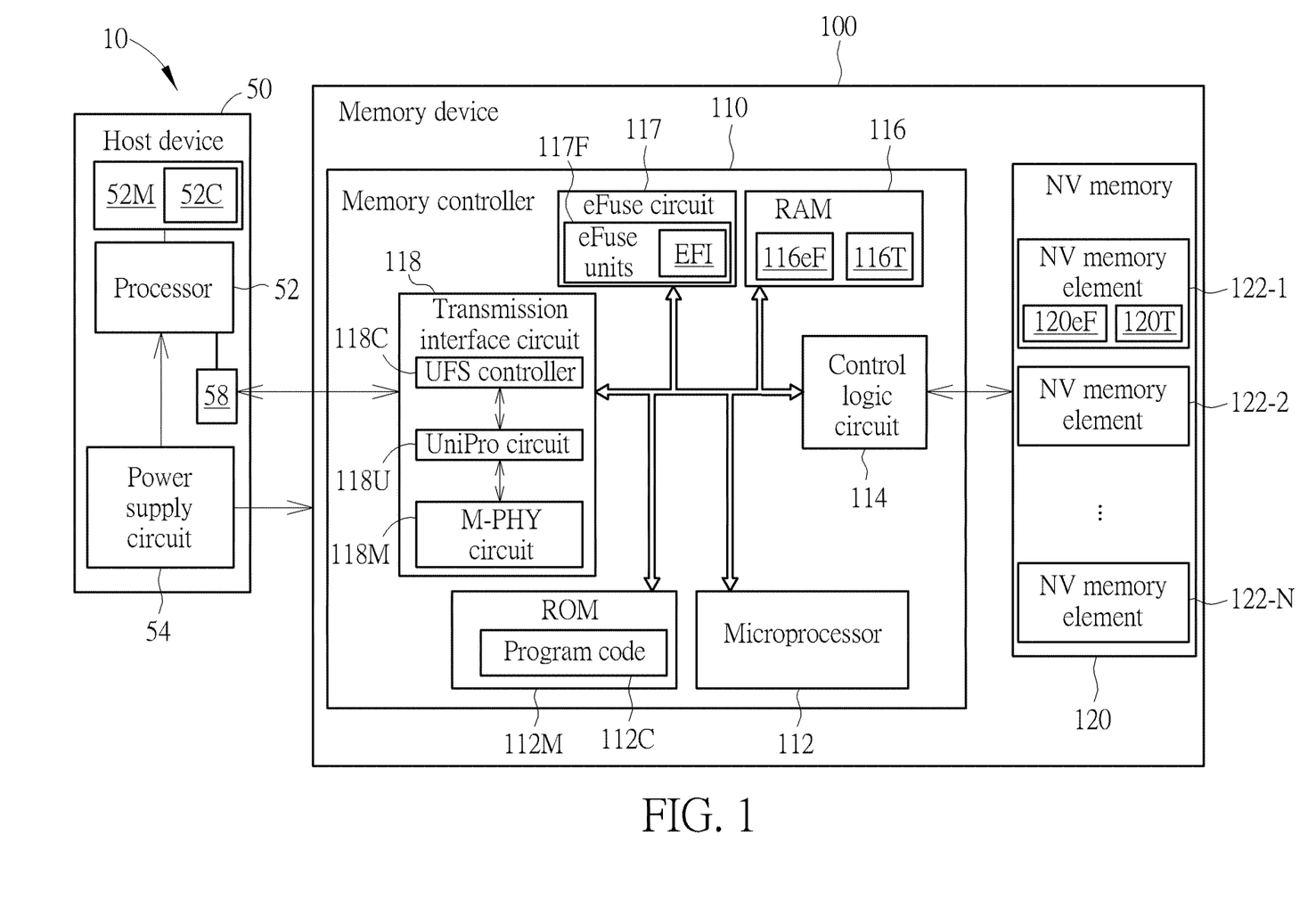
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a computer-readable medium 52M storing a program code 52C, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). In addition, the computer-readable medium 52M may be implemented by way of one or more hard disk drives (HDDs), one or more SSDs, etc. According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of Static Random Access Memory (SRAM), for example), an eFuse circuit 117 comprising multiple eFuse units 117F, and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programming upon the memory units or data pages of specific physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses. The NV memory 120 may store a global L2P address mapping table 120T, for the memory controller 110 to control the memory device 100 to access data in the NV memory 120, but the present invention is not limited thereto. For example, the NV memory 120 may store multiple in-system programming (ISP) codes, for providing the memory device 100 (e.g., the memory controller 110) with various functions, respectively. The memory controller 110 may load any ISP code among the multiple ISP codes from the NV memory 120 into at least one storage region (e.g., a program code region in the RAM 116) within the memory controller 110, and the processing circuit such as the microprocessor 112 may run the aforementioned any ISP code to make the memory device 100 (e.g., the memory controller 110) be equipped with a function corresponding to the aforementioned any ISP code among the various functions mentioned above.

For better comprehension, the global L2P address mapping table 120T may be located in a predetermined region within the NV memory element 122-1, such as a system region, where one or more ISP codes among the multiple ISP codes may be located in one or more predetermined regions within the NV memory element 122-1, such as one or more program code regions, but the present invention is not limited thereto. For example, the global L2P address mapping table 120T may be divided into a plurality of local L2P address mapping tables, and the local L2P address mapping tables, as well as the multiple ISP codes, may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table 116T which is stored as the temporary L2P address mapping table 116T, but the present invention is not limited thereto.

In addition, the aforementioned at least one NV memory element (e.g., the one or more NV memory elements such as the NV memory elements 122-1, 122-2, . . . , and 122-N) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N, may comprise multiple blocks, and a block within the multiple blocks may comprise and record a specific number of pages, where the memory controller 110 may access a certain page of a certain block within the multiple blocks according to a block address and a page address.

Based on the architecture shown in FIG. 1, the memory device 100 (e.g., the memory czZxontroller 110) can be arranged to perform configuration management of the memory device 100. For better comprehension, the host device 50 and the memory device 100 can be coupled to each other by using respective connectors (not shown in FIG. 1) of the host device 50 and the memory device 100, and the memory device 100 can be detachable from the host device 50. For example, a first host device may be arranged to play the role of the host device 50 in an MP phase of the memory device 100, where the first host device may represent a host device that is running a host-side program code such as an MP tool. For another example, a second host device may be arranged to play the role of the host device 50 in a user phase of the memory device 100, where the second host device may represent a host device equipped with the memory device 100 for daily use of the user of the memory device 100.

Figure 2:
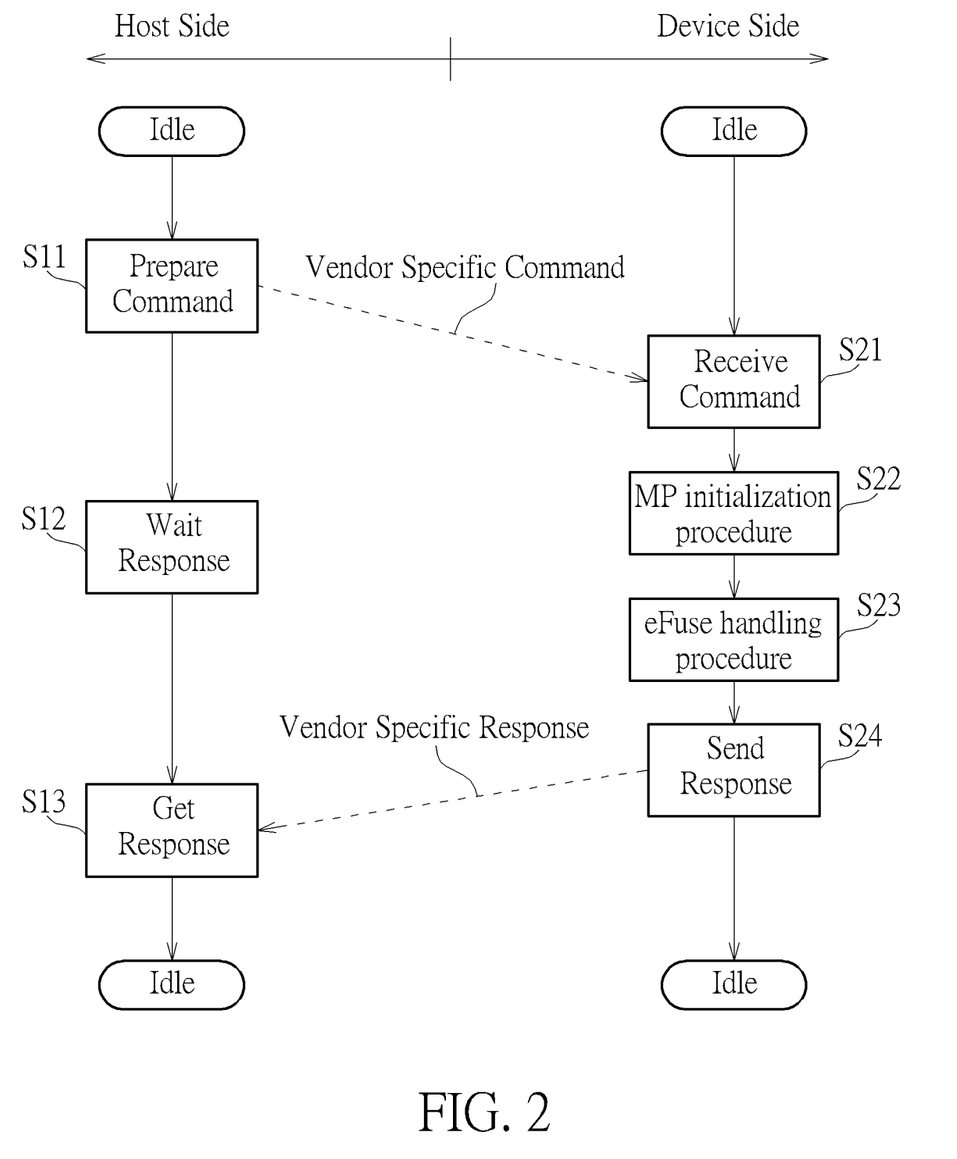
FIG. 2 illustrates an MP initialization control scheme of a method for performing configuration management of a memory device such as that shown in FIG. 1 in a predetermined communications architecture with aid of eFuse data preparation according to an embodiment of the present invention.

FIG. 2 illustrates an MP initialization control scheme of a method for performing configuration management of a memory device such as that shown in FIG. 1 in a predetermined communications architecture (e.g., a UFS communications architecture) with aid of eFuse data preparation according to an embodiment of the present invention. The method can be applied to the architecture shown in FIG. 1, for example, the electronic device 10, the host device 50, the memory device 100, and the memory controller 110, and more particularly, the components within the memory controller 110.

In the MP phase of the memory device 100, the host device 50 such as the first host device may run the program code 52C such as the MP tool to control MP initialization of the memory device 100. During the MP initialization, the memory device 100 (e.g., the memory controller 110) can be arranged to perform the configuration management, and more particularly, to generate protected eFuse data 116eF in the RAM 116 according to eFuse information EFI in the multiple eFuse units 117F and write the protected eFuse data 116eF into the NV memory 120 to generate protected eFuse data 120eF, where the protected eFuse data 120eF may be stored in the predetermined region such as the system region, and may be regarded as a backup of the protected eFuse data 116eF, but the present invention is not limited thereto. Please note that, when writing the protected eFuse data 116eF into the NV memory 120, the memory controller 110 may perform data processing (e.g., ECC encoding and randomization) on the protected eFuse data 116eF to generate a data processing result (e.g., an ECC encoded and randomized result) of the protected eFuse data 116eF, such as an ECC encoded and randomized version of the protected eFuse data 116eF, to be the protected eFuse data 120eF. When there is a need, for example, in the user phase of the memory device 100, the memory controller 110 may perform inverse data processing (e.g., ECC decoding and de-randomization) on the protected eFuse data 120eF to generate an inverse data processing result (e.g., an ECC decoded and de-randomized result) of the protected eFuse data 120eF, such as an ECC decoded and de-randomized version of the protected eFuse data 120eF, to be the protected eFuse data 116eF.

As shown in FIG. 2, at the host side of the host device 50, the host device 50 (e.g., the processor 52 running the program code 52C such as the MP tool) can be in an idle state, and then leave this idle state to perform the operations of Steps S11, S12 and S13, and enter the idle state thereof afterward. At the device side of the memory device 100, the memory device 100 (e.g., the memory controller 110) can be in an idle state, and then leave this idle state to perform the operations of Steps S21, S22, S23 and S24, and enter the idle state thereof afterward. In Step S11, during the MP phase of the memory device 100, the host device 50 (e.g., the processor 52 running the program code 52C such as the MP tool) may prepare a first command (labeled "Prepare Command" for brevity), and more particularly, send the first command from the host device 50 to the memory device 100 (e.g., the memory controller 110) through the transmission interface circuit 58, to trigger the memory controller 110 to execute at least one procedure (e.g., one or more procedures) regarding the MP initialization of the memory device 100. For example, the first command may represent a vendor specific command (e.g., a vendor-defined command, which may be defined by a vendor of the memory controller 110). The vendor specific command can be configured for starting running the aforementioned at least one procedure on the memory device 100, where the vendor specific command can be implemented by way of a write buffer command of the UFS specification, but the present invention is not limited thereto.

For example, operations of a first procedure among the among the aforementioned at least one procedure may comprise:

(1) obtaining the eFuse information EFI from the eFuse circuit 117 within the memory controller 110;

(2) preparing the protected eFuse data 116eF in the RAM 116 within the memory controller 110 according to the eFuse information EFI, where the protected eFuse data 116eF may comprise an encrypted result of the eFuse information EFI, for example, the memory controller 110 may encrypt the eFuse information EFI according to a predetermined encryption method to generate the encrypted result of the eFuse information EFI to be the protected eFuse data 116eF; and (3) storing the protected eFuse data 116eF into the NV memory 120 to generate the protected eFuse data 120eF, for being used as replacement of the eFuse information EFI in the user phase of the memory device 100, where the protected eFuse data 120eF may also comprise the encrypted result of the eFuse information EFI;

where the first procedure may represent an eFuse handling procedure for preparing the protected eFuse data 120eF and storing the protected eFuse data 120eF to generate the protected eFuse data 120eF, but the present invention is not limited thereto. In addition to the first procedure such as the eFuse handling procedure, the aforementioned at least one procedure may further comprise another procedure. For example, operations of the other procedure among the aforementioned at least one procedure may comprise:

(1) storing at least one ISP code (e.g., the multiple ISP codes) from the host device 50 into the NV memory 120, for being loaded onto the RAM 116 in the user phase of the memory device 100 to provide at least one corresponding function (e.g., the aforementioned various functions) of the memory device 100;

where the other procedure may represent an MP initialization procedure for controlling the MP initialization of the memory device 100.

In Step S12, during the MP phase of the memory device 100, after sending the first command to trigger the memory controller 110 to execute the aforementioned at least one procedure, the host device 50 (e.g., the processor 52 running the program code 52C such as the MP tool) may wait for a first response that is sent by the memory device 100 (e.g., the memory controller 110) in response to the first command (labeled "Wait Response" for brevity).

In Step S13, during the MP phase of the memory device 100, the host device 50 (e.g., the processor 52 running the program code 52C such as the MP tool) may receive the first response from the memory device 100 (e.g., the memory controller 110) through the transmission interface circuit 58 to get the first response (labeled "Get Response" for brevity). For example, the first command may represent the vendor specific command (e.g., the vendor-defined command), and the first response may represent a vendor specific response (e.g., a vendor-defined response) corresponding to the vendor specific command (e.g., the vendor-defined command), for indicating a processing result of the MP initialization performed by the memory device 100 (e.g., the memory controller 110).

In Step S21, during the MP phase of the memory device 100, the memory device 100 (e.g., the memory controller 110) may receive the first command from the host device 50 through the transmission interface circuit 118 (labeled "Receive Command" for brevity).

After receiving the first command from the host device 50, the memory device 100 (e.g., the memory controller 110) may execute the aforementioned at least one procedure regarding the MP initialization of the memory device 100, where the aforementioned at least one procedure may comprise the MP initialization procedure and the eFuse handling procedure.

In Step S22, during the MP phase of the memory device 100, the memory device 100 (e.g., the memory controller 110) may execute the MP initialization procedure.

In Step S23, during the MP phase of the memory device 100, the memory device 100 (e.g., the memory controller 110) may execute the eFuse handling procedure.

In Step S24, during the MP phase of the memory device 100, after executing the aforementioned at least one procedure such as the MP initialization procedure and the eFuse handling procedure, the memory device 100 (e.g., the memory controller 110) may send the first response to the host device 50 through the transmission interface circuit 118 (labeled "Send Response" for brevity).

For better comprehension, the method may be illustrated with the respective working flows of the host device 50 and the memory device 100 as shown in FIG. 2, but the present invention is not limited thereto. According to some embodiments, one or more steps may be added, deleted, or changed in any of the respective working flows of the host device 50 and the memory device 100 as shown in FIG. 2. For example, the memory device 100 (e.g., the memory controller 110) can be arranged to execute at least one operation (e.g., one or more operations) of the MP initialization procedure first, and to execute the eFuse handling procedure afterward and then return to the MP initialization procedure.

According to some embodiments, after the MP phase of the memory device 100, a firmware code of the memory device 100 (e.g., the memory controller 110), as well as the protected eFuse data 120eF (e.g., the per-die configuration information of the memory controller 110), may have been well prepared in the NV memory 120, where the firmware code may comprise the aforementioned at least one ISP code (e.g., the multiple ISP codes), but the present invention is not limited thereto. For brevity, similar descriptions for these embodiments are not repeated in detail here.

According to some embodiments, the host device 50 such as the first host device can be arranged to send a device-side program code regarding the MP initialization of the memory device 100 to the memory controller 110, for being loaded onto the RAM 116 within the memory controller 110, where the device-side program code comprises the aforementioned at least one procedure such as the MP initialization procedure and the eFuse handling procedure, but the present invention is not limited thereto. For brevity, similar descriptions for these embodiments are not repeated in detail here.

Figure 3:
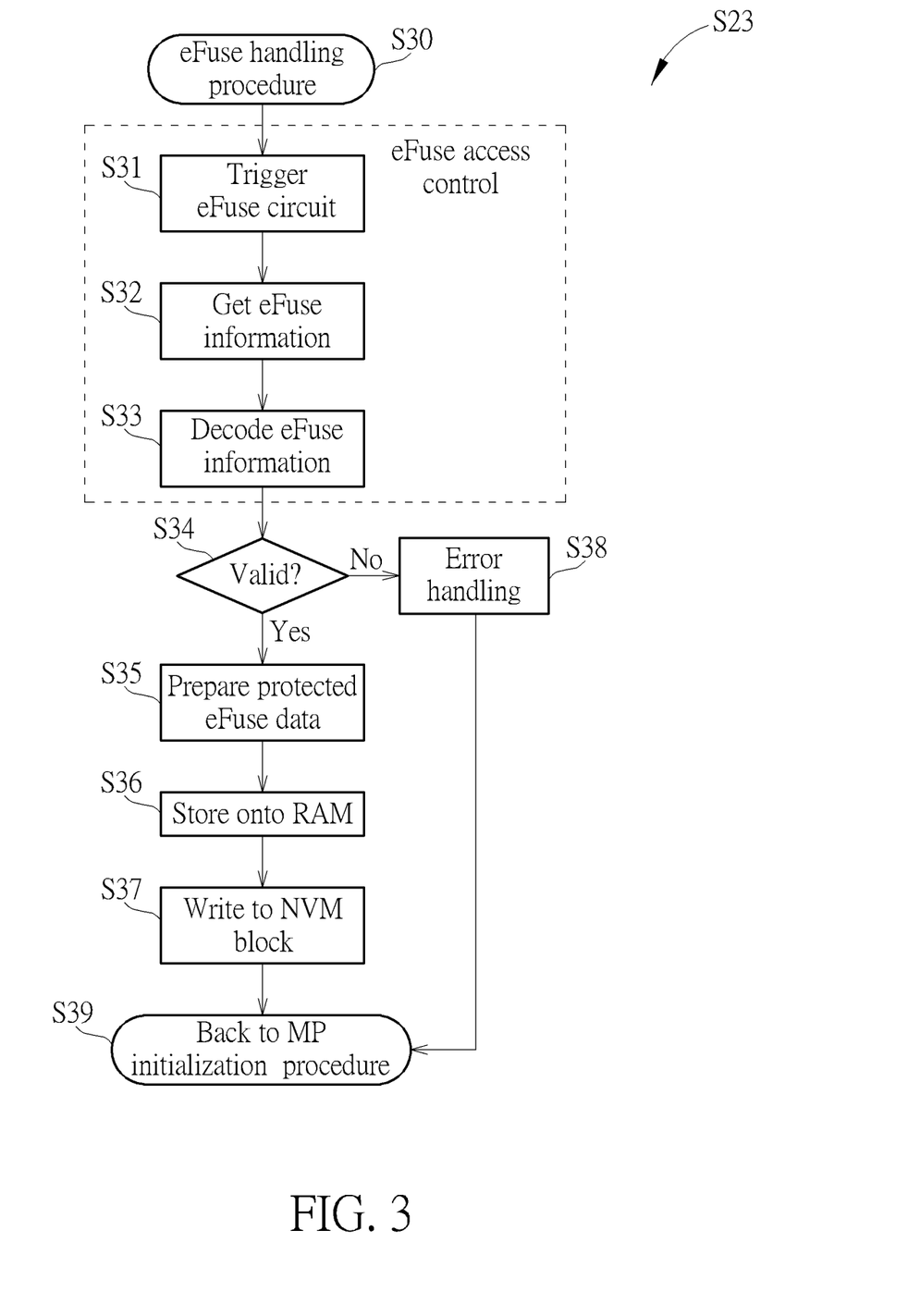
FIG. 3 illustrates a working flow of an eFuse handling procedure involved with the MP initialization control scheme shown in FIG. 2 according to an embodiment of the present invention.

FIG. 3 illustrates a working flow of an eFuse handling procedure involved with the MP initialization control scheme shown in FIG. 2 according to an embodiment of the present invention, where Step S23 shown in FIG. 2 may comprise multiple sub-steps such as the steps shown in FIG. 3, but the present invention is not limited thereto.

In Step S30, the memory device 100 (e.g., the memory controller 110) may start executing the eFuse handling procedure.

As shown in the upper half of FIG. 3, the memory device 100 (e.g., the memory controller 110) may perform eFuse access control, where the eFuse access control may comprise the operations of Steps S31-S33.

In Step S31, the memory device 100 (e.g., the memory controller 110) may trigger the eFuse circuit 117 to read the eFuse information EFI from the multiple eFuse units 117F. For example, the memory controller 110 (e.g., the microprocessor 112) may read the eFuse information EFI according to a predetermined eFuse address to trigger the eFuse circuit 117 to return the eFuse information EFI obtained from the multiple eFuse units 117F.

In Step S32, the memory device 100 (e.g., the memory controller 110) may get the eFuse information EFI from the eFuse circuit 117.

In Step S33, the memory device 100 (e.g., the memory controller 110) may decode the eFuse information EFI. For example, the eFuse information EFI may comprise raw eFuse information, and may further comprise correctness checking information of the raw eFuse information, such as a hash value, a cyclic redundancy check (CRC) code, etc. of the raw eFuse information, where the memory controller 110 may check whether the eFuse information EFI is valid according to the correctness checking information embedded in the eFuse information EFI, but the present invention is not limited thereto. According to some embodiments, implementation of the correctness checking information may vary. In addition, the memory controller 110 may decode the eFuse information EFI to generate calculated correctness checking information of the raw eFuse information, for being compared with the correctness checking information embedded in the eFuse information EFI obtained from the eFuse circuit 117, for performing integrity check on the eFuse information EFI.

In Step S34, the memory device 100 (e.g., the memory controller 110) may check whether the eFuse information EFI is valid. If Yes, Step S35 is entered; if No, Step S38 is entered. The memory controller 110 may perform the integrity check on the eFuse information EFI, and more particularly, refer to the raw eFuse information to perform calculation according to a predetermined calculation rule to generate the calculated correctness checking information mentioned above, such as a calculated hash value, a calculated CRC code, etc. of the raw eFuse information, and further compare the calculated correctness checking information (e.g., the calculated hash value or the calculated CRC code) with the correctness checking information (e.g., the hash value or the RC code) embedded in the eFuse information EFI obtained from the eFuse circuit 117, for determining validity of the eFuse information EFI. For example, the memory controller 110 may determine whether the eFuse information EFI is valid as follows:

(1) when the calculated correctness checking information (e.g., the calculated hash value or the calculated CRC code) is equal to the correctness checking information (e.g., the hash value or the RC code) embedded in the eFuse information EFI, the memory controller 110 may determine that the eFuse information EFI is valid (e.g., Step S35 is entered); and (2) when the calculated correctness checking information (e.g., the calculated hash value or the calculated CRC code) is not equal to the correctness checking information (e.g., the hash value or the RC code) embedded in the eFuse information EFI, the memory controller 110 may determine that the eFuse information EFI is not valid (e.g., Step S38 is entered).

In Step S35, the memory device 100 (e.g., the memory controller 110) may utilize the processing circuit such as the microprocessor 112 to prepare the protected eFuse data 116eF.

In Step S36, the memory device 100 (e.g., the memory controller 110) may store the protected eFuse data 116eF onto the RAM 116.

In Step S37, the memory device 100 (e.g., the memory controller 110) may write the protected eFuse data 116eF to at least one NV memory (NVM) block (e.g., one or more NVM blocks), such as at least one block (e.g., one or more blocks) within the NV memory 120, to generate the protected eFuse data 120eF.

In Step S38, the memory device 100 (e.g., the memory controller 110) may perform error handling, and more particularly, correct one or more errors and/or generate an error message for being returned to the host device 50.

In Step S39, the memory device 100 (e.g., the memory controller 110) may return or go back to the MP initialization procedure.

For better comprehension, the method may be illustrated with the working flow shown in FIG. 3, but the present invention is not limited thereto. According to some embodiments, one or more steps may be added, deleted, or changed in the working flow shown in FIG. 3.

Figure 4:
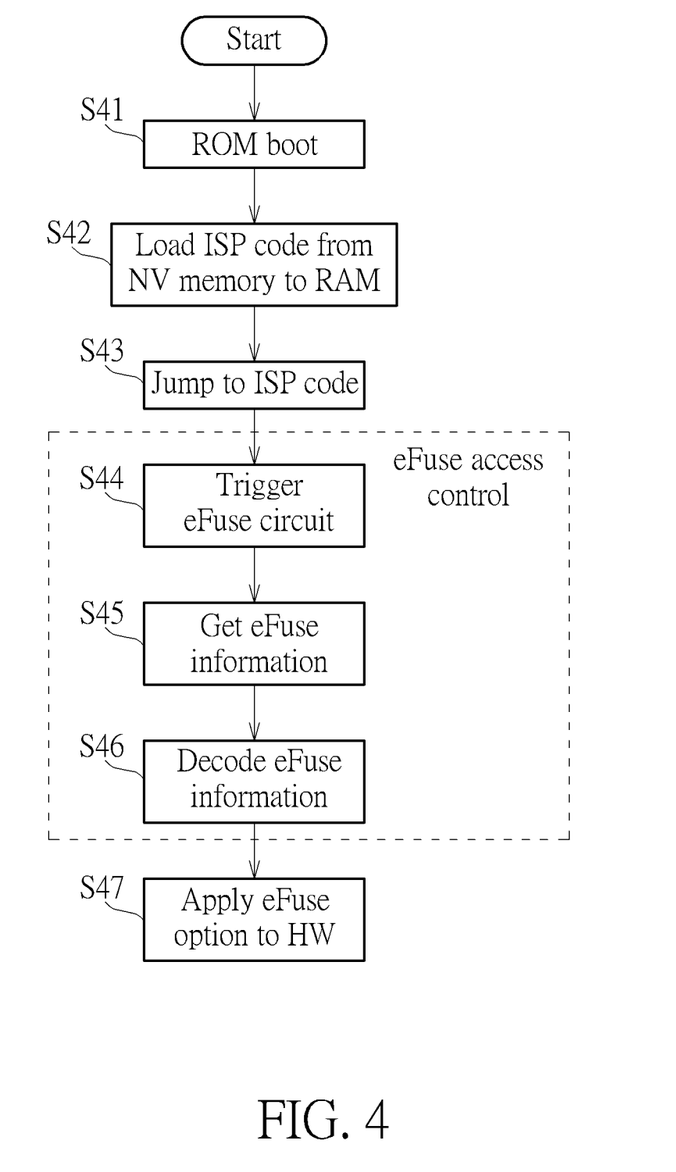
FIG. 4 illustrates a user-phase booting flow of a first control scheme according to an embodiment of the present invention.

FIG. 4 illustrates a user-phase booting flow of a first control scheme according to an embodiment of the present invention. For better comprehension, assume that the eFuse handling procedure of the MP initialization control scheme shown in FIG. 2 (e.g., the working flow of the eFuse handling procedure as shown in FIG. 3) can be temporarily disabled, but the present invention is not limited thereto.

In Step S41, after a hardware reset or power-up in the user phase of the memory device 100, the memory device 100 (e.g., the memory controller 110) may perform ROM boot, and more particularly, utilize the processing circuit such as the microprocessor 112 to run the program code 112C of the ROM 112M to perform a boot-up procedure, where the program code 112C may comprise the boot-up procedure.

In Step S42, the memory device 100 (e.g., the memory controller 110) may load the aforementioned at least one ISP code (e.g., the multiple ISP codes) from the NV memory 120 to the RAM 116.

In Step S43, the memory device 100 (e.g., the memory controller 110) may jump to the aforementioned at least one ISP code (e.g., the multiple ISP codes), and more particularly, utilize the processing circuit such as the microprocessor 112 to run the aforementioned at least one ISP code (e.g., the multiple ISP codes), to provide the aforementioned at least one corresponding function (e.g., the aforementioned various functions) of the memory device 100.

As shown in the lower half of FIG. 4, the memory device 100 (e.g., the memory controller 110) may perform eFuse access control, where the eFuse access control of this embodiment may comprise the operations of Steps S44-S46. For example, the eFuse access control (e.g., the operations of Steps S44-S46) shown in the lower half of FIG. 4 may be similar to or the same as the eFuse access control (e.g., the operations of Steps S31-S33) shown in the upper half of FIG. 3, but the present invention is not limited thereto.

In Step S44, the memory device 100 (e.g., the memory controller 110) may trigger the eFuse circuit 117 to read the eFuse information EFI from the multiple eFuse units 117F.

In Step S45, the memory device 100 (e.g., the memory controller 110) may get the eFuse information EFI from the eFuse circuit 117.

In Step S46, the memory device 100 (e.g., the memory controller 110) may decode the eFuse information EFI.

In Step S47, the memory device 100 (e.g., the memory controller 110) may apply multiple eFuse options to the hardware architecture of the memory device 100 (e.g., the memory controller 110) according to the eFuse information EFI (e.g., the raw eFuse information), and more particularly, perform associated hardware settings of the memory controller 110 according to the eFuse information EFI (labeled "Apply eFuse option to HW" for brevity).

Figure 5:
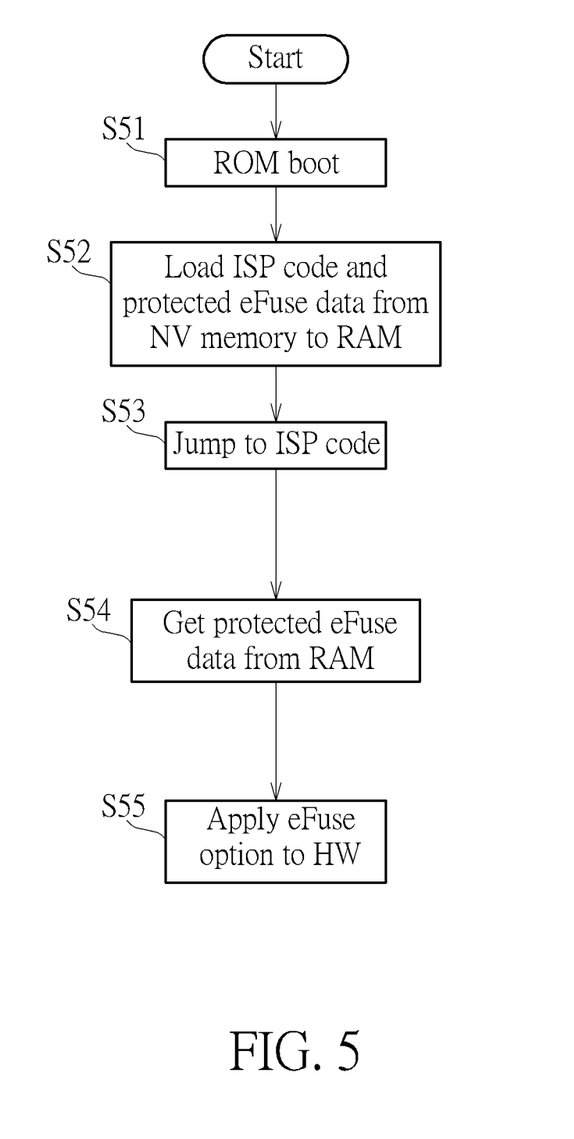
FIG. 5 illustrates a user-phase booting flow of the method according to an embodiment of the present invention.

FIG. 5 illustrates a user-phase booting flow of the method according to an embodiment of the present invention. In comparison with the first control scheme shown in FIG. 4, the eFuse handling procedure of the MP initialization control scheme shown in FIG. 2 (e.g., the working flow of the eFuse handling procedure as shown in FIG. 3) is not disabled in this embodiment.

In Step S51, after a hardware reset or power-up in the user phase of the memory device 100, the memory device 100 (e.g., the memory controller 110) may perform the ROM boot, and more particularly, utilize the processing circuit such as the microprocessor 112 to run the program code 112C of the ROM 112M to perform the boot-up procedure, where the program code 112C may comprise the boot-up procedure.

In Step S52, the memory device 100 (e.g., the memory controller 110) may load the aforementioned at least one ISP code (e.g., the multiple ISP codes) and the protected eFuse data 120eF from the NV memory 120 to the RAM 116, and more particularly, load the protected eFuse data 120eF from the NV memory 120 to the RAM 116 to be the protected eFuse data 116eF, where both of the protected eFuse data 120eF and 116eF may carry the raw eFuse information.

In Step S53, the memory device 100 (e.g., the memory controller 110) may jump to the aforementioned at least one ISP code (e.g., the multiple ISP codes), and more particularly, utilize the processing circuit such as the microprocessor 112 to run the aforementioned at least one ISP code (e.g., the multiple ISP codes), to provide the aforementioned at least one corresponding function (e.g., the aforementioned various functions) of the memory device 100.

In Step S54, the memory device 100 (e.g., the memory controller 110) may get the protected eFuse data 116eF from the RAM 116, rather than performing any eFuse access control such as that shown in FIG. 4.

In Step S55, the memory device 100 (e.g., the memory controller 110) may apply the multiple eFuse options to the hardware architecture of the memory device 100 (e.g., the memory controller 110) according to the protected eFuse data 116eF (e.g., the raw eFuse information carried by the protected eFuse data 116eF), and more particularly, perform associated hardware settings of the memory controller 110 according to the protected eFuse data 116eF (labeled "Apply eFuse option to HW" for brevity).

For better comprehension, the method may be illustrated with the working flow shown in FIG. 5, but the present invention is not limited thereto. According to some embodiments, one or more steps may be added, deleted, or changed in the working flow shown in FIG. 5.

According to some embodiments, during the MP phase of the memory device 100, when executing the first procedure such as the eFuse handling procedure, the memory controller 110 may have encrypted the eFuse information EFI according to the predetermined encryption method to generate the encrypted result of the eFuse information EFI to be the protected eFuse data 116eF, to make both of the protected eFuse data 116eF and 120eF comprise the encrypted result of the eFuse information EFI in the MP phase of the memory device 100. As a result, during the user phase of the memory device 100, the protected eFuse data 120eF may have been well prepared in the NV memory 120 at the time when Step S52 is executed, to make both of the protected eFuse data 120eF and 116eF comprise the encrypted result of the eFuse information EFI, where both of the protected eFuse data 120eF and 116eF may carry the raw eFuse information since the eFuse information EFI comprises the raw eFuse information. For brevity, similar descriptions for these embodiments are not repeated in detail here.

According to some embodiments, during the MP phase of the memory device 100, when executing the first procedure such as the eFuse handling procedure, the memory controller 110 may protect the protected eFuse data 116eF and 120eF with anther protection method (e.g., by configuring the predetermined region such as the system region to be a protected and/or hidden region that cannot be accessed by the second host device in the user phase of the memory device 100), having no need to encrypt the eFuse information EFI to generate the encrypted result of the eFuse information EFI to be the protected eFuse data 116eF, where both of the protected eFuse data 116eF and 120eF may comprise the eFuse information EFI in the MP phase of the memory device 100. As a result, during the user phase of the memory device 100, the protected eFuse data 120eF may have been well prepared in the NV memory 120 at the time when Step S52 is executed, to make both of the protected eFuse data 120eF and 116eF comprise the eFuse information EFI, where both of the protected eFuse data 120eF and 116eF may carry the raw eFuse information since the eFuse information EFI comprises the raw eFuse information. For brevity, similar descriptions for these embodiments are not repeated in detail here.

Figure 6:
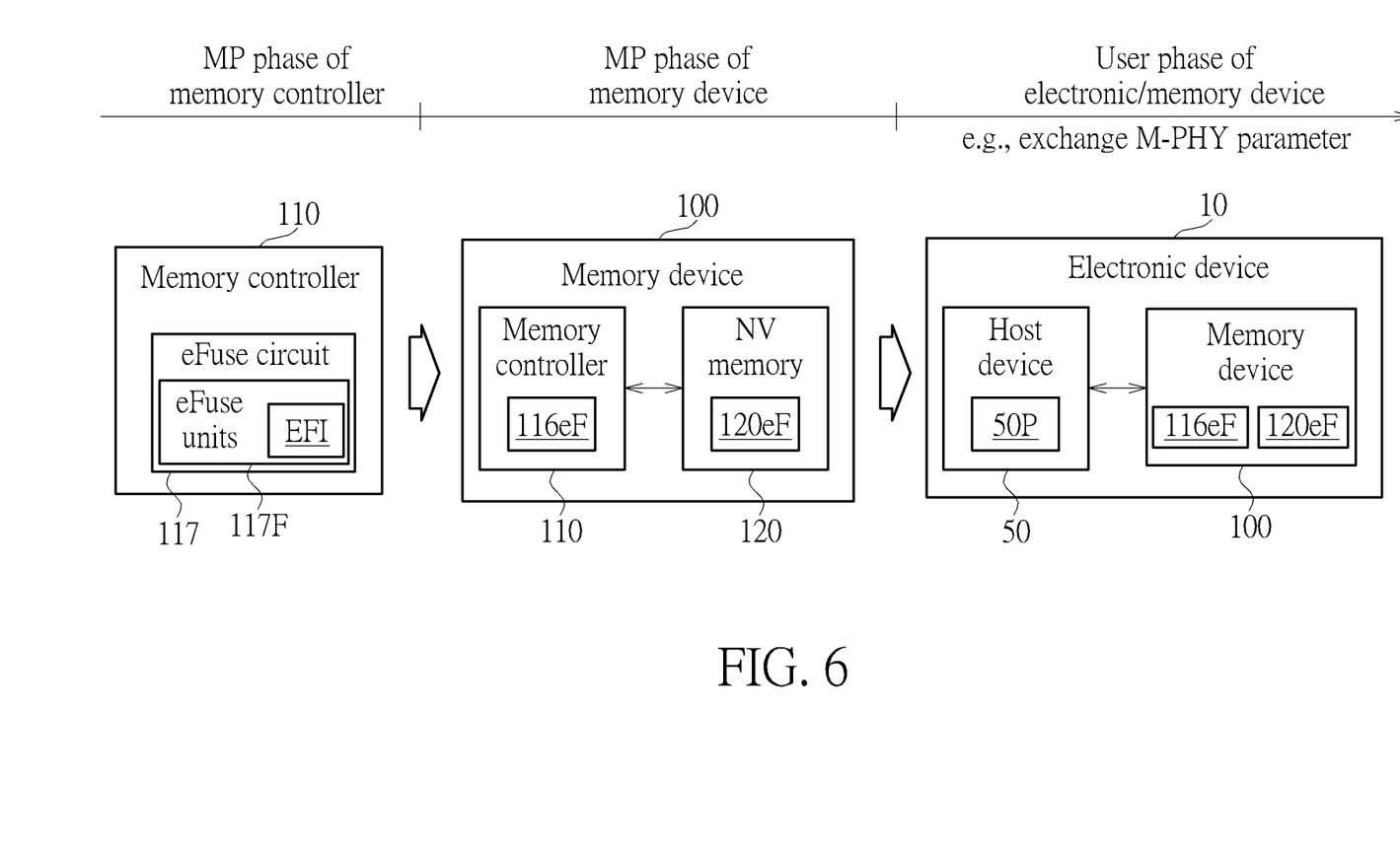
FIG. 6 illustrates an eFuse data preparation and user-phase configuration control scheme of the method according to an embodiment of the present invention.

FIG. 6 illustrates an eFuse data preparation and user-phase configuration control scheme of the method according to an embodiment of the present invention. As the memory device 100 can be coupled to the host device 50 such as the second host device for daily use of the user of the memory device 100, the user of the memory device 100 can be regarded as the user of the electronic device 10 (e.g., the host device 50 such as the second host device, as well as the memory device 100, in the architecture shown in FIG. 1), where the user phase of the memory device 100 can be regarded as the user phase of the electronic device 10 (labeled "User phase of electronic/memory device" for brevity).

According to this embodiment, before the MP phase of the memory device 100, the eFuse information EFI may have been well prepared in the multiple eFuse units 117F of eFuse circuit 117 during an MP phase of the memory controller 110, where the eFuse information EFI (e.g., the raw eFuse information mentioned above) may comprise per-die configuration information of the memory controller 110, such as per-die PHY configuration information (e.g., a set of M-PHY parameters) of the PHY circuit 118M within the transmission interface circuit 118 of the memory controller 110, per-die thermal sensor configuration information (e.g., a set of thermal sensor parameters) of at least one thermal sensor (e.g., one or more thermal sensors) within the memory controller 110, per-die core voltage information (e.g., a per-die core voltage) of the memory controller 110 (e.g., the processing circuit such as the microprocessor 112), etc. In addition, as the memory controller 110 can generate the protected eFuse data 160eF and 120eF according to the eFuse information EFI in the MP phase of the memory device 100, both of the protected eFuse data 160eF and 120eF may also comprise the per-die configuration information of the memory controller 110, such as the per-die PHY configuration information (e.g., the set of M-PHY parameters) of the PHY circuit 118M, the per-die thermal sensor configuration information (e.g., the set of thermal sensor parameters) of the aforementioned at least one thermal sensor, the per-die core voltage information (e.g., the per-die core voltage) of the memory controller 110, etc. As a result, the protected eFuse data 120eF (e.g., the per-die configuration information of the memory controller 110) may have been well prepared in the NV memory 120 after the MP phase of the memory device 100.

In the user phase of the memory device 100, the host device 50 such as the second host device may run the program code 52C such as an operating system (OS), etc. to access the memory device 100, and more particularly, to write system data, user data, etc. into the memory device 100 (e.g., the NV memory 120, via the memory controller 110) and read system data, user data, etc. from the memory device 100 (e.g., the NV memory 120, via the memory controller 110). During user-phase initialization, such as the initialization after a hardware reset or power-up in the user phase of the memory device 100, the memory controller 110 can rapidly load the protected eFuse data 120eF from the NV memory 120 to the RAM 116 within the memory controller 110, rather than loading any eFuse bit information (e.g., any bit of multiple eFuse bits stored in the multiple eFuse units 117F) among the eFuse information EFI from the eFuse circuit 117 within the memory controller 110, to complete the user-phase initialization in time. For example, operations of the user-phase initialization may comprise:

(1) the memory controller 110 may exchange the M-PHY parameters with the host device 50, to allow the host device 50 to store the per-die PHY configuration information such as the set of M-PHY parameters into a certain memory within the host device 50 to be the device-side M-PHY parameters 50P, for performing communications with the memory device 100 (e.g., the transmission interface circuit 118) according to the one or more communications specification for the host device 50, where the host device 50 (e.g., the transmission interface circuit 58) may refer to the device-side M-PHY parameters 50P to perform communications with the memory device 100 (e.g., the transmission interface circuit 118); and (2) the memory controller 110 may set up the aforementioned at least one thermal sensor according to the per-die thermal sensor configuration information such as the set of thermal sensor parameters; but the present invention is not limited thereto. As the memory controller 110 complete the user-phase initialization in time without being delayed by loading the aforementioned any eFuse bit information (e.g., the aforementioned any bit of the multiple eFuse bits stored in the multiple eFuse units 117F) among the eFuse information EFI from the eFuse circuit 117, the memory controller 110 can guarantee that the memory device 100 can become ready for being used by the host device 50 in a predetermined user-phase initialization time. For brevity, similar descriptions for this embodiment are not repeated in detail here.

According to some embodiments, when there is a need, the memory device 100 (e.g., the memory controller 110) can be arranged to perform the configuration management in the user phase, and more particularly, to generate the protected eFuse data 116eF in the RAM 116 according to the eFuse information EFI in the multiple eFuse units 117F and write the protected eFuse data 116eF into the NV memory 120 to generate the protected eFuse data 120eF, for example, in the same or similar manner as that of the MP initialization, where the configuration management can be perform periodically or intermittently. According to a predetermined eFuse data checking schedule, the memory controller 110 can periodically or non-periodically check whether the protected eFuse data 120eF is healthy (e.g., correct), for example, by performing ECC processing to obtain an error bit count and comparing the error bit count with a predetermined error bit count threshold. When the error bit count reaches (e.g., is greater than or equal to) the predetermined error bit count threshold, the memory controller 110 can determine that the protected eFuse data 120eF is non-healthy (e.g., incorrect), and therefore start performing the configuration management to recover the protected eFuse data 120eF, but the present invention is not limited thereto. For example, when failing to obtain the protected eFuse data 120eF without any error from the NV memory 120, the memory controller 110 can start performing the configuration management to recover the protected eFuse data 120eF. For brevity, similar descriptions for these embodiments are not repeated in detail here.

The method and associated apparatus provided by the present invention can guarantee that the memory device 100 can operate properly in various situations. For example, the protected eFuse data 120eF has been well prepared in the NV memory 120 during the MP phase of the memory device 100. During the user-phase initialization, such as the initialization after a hardware reset or power-up (e.g., every hardware reset or power-up) in the user phase of the memory device 100, the memory controller 110 can rapidly load the protected eFuse data 120eF from the NV memory 120 to the RAM 116 within the memory controller 110, to complete the user-phase initialization in time, and therefore can guarantee that the memory device 100 can become ready for being used by the host device 50 in the predetermined user-phase initialization time. In addition, in comparison with the related art, the method and associated apparatus provided by the present invention can greatly reduce the number of times of reading the eFuse units 117F in the user phase of the memory device 100 to correspondingly enhance the reliability of the eFuse units 117F, and more particularly, can reduce the number of times of reading the eFuse units 117F in the user phase of the memory device 100 to be zero in a situation where the protected eFuse data 120eF is kept healthy throughout the lifetime of the memory device 100. Therefore, the present invention method and apparatus can solve the related art problems without introducing any side effect or in a way that is less likely to introduce a side effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing configuration management of a memory device in a predetermined communications architecture with aid of electronic fuse (eFuse) data preparation, the method being applied to a memory controller of the memory device, the memory device comprising the memory controller and a non-volatile (NV) memory, the NV memory comprising at least one NV memory element, the method comprising:

during a mass production (MP) phase of the memory device, utilizing the memory controller to receive a first command from a host device through a transmission interface circuit of the memory controller;

during the MP phase of the memory device, after receiving the first command from the host device, utilizing the memory controller to execute at least one procedure regarding MP initialization of the memory device, wherein operations of a first procedure among the at least one procedure comprise:

obtaining eFuse information from an eFuse circuit within the memory controller;

preparing protected eFuse data in a Random Access Memory (RAM) within the memory controller according to the eFuse information; and storing the protected eFuse data into the NV memory, for being used as replacement of the eFuse information in a user phase of the memory device; and during the MP phase of the memory device, after executing the at least one procedure, utilizing the memory controller to send a first response to the host device through the transmission interface circuit, wherein the first response is sent to the host device in response to the first command.

2. The method of claim 1, wherein the first command represents a vendor specific command, and the vendor specific command is configured for starting running the at least one procedure on the memory device.

3. The method of claim 1, wherein the host device is arranged to send a device-side program code regarding the MP initialization of the memory device to the memory controller, for being loaded onto the RAM within the memory controller, wherein the device-side program code comprises the at least one procedure.

4. The method of claim 1, wherein the first procedure represents an eFuse handling procedure for preparing and storing the protected eFuse data.

5. The method of claim 4, wherein in addition to the eFuse handling procedure, the at least one procedure further comprises an MP initialization procedure for controlling the MP initialization of the memory device.

6. The method of claim 5, wherein the memory controller is arranged to execute at least one operation of the MP initialization procedure first, and to execute the eFuse handling procedure afterward and then return to the MP initialization procedure.

7. The method of claim 1, wherein operations of another procedure among the at least one procedure comprises:
storing at least one in-system programming (ISP) code from the host device into the NV memory, for being loaded onto the RAM in the user phase of the memory device to provide at least one corresponding function of the memory device.

8. The method of claim 1, wherein the protected eFuse data comprises an encrypted result of the eFuse information.

9. The method of claim 1, wherein the protected eFuse data comprises per-die configuration information of the memory controller.

10. The method of claim 9, wherein the per-die configuration information comprises one or a combination of per-die physical layer (PHY) configuration information of a PHY circuit within the transmission interface circuit of the memory controller, per-die thermal sensor configuration information of at least one thermal sensor within the memory controller, and per-die core voltage information of the memory controller.

11. A memory controller of a memory device, the memory device comprising the memory controller and a non-volatile (NV) memory, the NV memory comprising at least one NV memory element, the memory controller comprising:
a processing circuit, arranged to control the memory controller according to a plurality of host commands from a host device, to allow the host device to access the NV memory through the memory controller, wherein the processing circuit is arranged to perform configuration management of the memory device in a predetermined communications architecture with aid of electronic fuse (eFuse) data preparation; and
a transmission interface circuit, arranged to perform communications with the host device;
wherein:
during a mass production (MP) phase of the memory device, the memory controller receives a first command from the host device through the transmission interface circuit of the memory controller;
during the MP phase of the memory device, after receiving the first command from the host device, the memory controller executes at least one procedure regarding MP initialization of the memory device, wherein operations of a first procedure among the at least one procedure comprise:
obtaining eFuse information from an eFuse circuit within the memory controller;
preparing protected eFuse data in a Random Access Memory (RAM) within the memory controller according to the eFuse information; and
storing the protected eFuse data into the NV memory, for being used as replacement of the eFuse information in a user phase of the memory device; and
during the MP phase of the memory device, after executing the at least one procedure, the memory controller sends a first response to the host device through the transmission interface circuit, wherein the first response is sent to the host device in response to the first command.

12. The memory device comprising the memory controller of claim 11, wherein the memory device comprises:
the NV memory, configured to store information; and
the memory controller, coupled to the NV memory, configured to control operations of the memory device.

13. An electronic device comprising the memory device of claim 12, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

14. A method for performing configuration management of a memory device in a predetermined communications architecture with aid of electronic fuse (eFuse) data preparation, the method being applied to a host device coupled to the memory device, the memory device comprising a memory controller and a non-volatile (NV) memory, the NV memory comprising at least one NV memory element, the method comprising:
during a mass production (MP) phase of the memory device, sending a first command from the host device to the memory controller through a transmission interface circuit of the host device, to trigger the memory controller to execute at least one procedure regarding MP initialization of the memory device, wherein operations of a first procedure among the at least one procedure comprise:
obtaining eFuse information from an eFuse circuit within the memory controller;
preparing protected eFuse data in a Random Access Memory (RAM) within the memory controller according to the eFuse information; and
storing the protected eFuse data into the NV memory, for being used as replacement of the eFuse information in a user phase of the memory device;
during the MP phase of the memory device, after sending the first command to trigger the memory controller to execute the at least one procedure, waiting for a first response from the memory controller; and
during the MP phase of the memory device, receiving the first response from the memory controller through the transmission interface circuit to get the first response, wherein the first response is sent by the memory controller to the host device in response to the first command.

15. The method of claim 14, wherein the first command represents a vendor specific command, and the vendor specific command is configured for starting running the at least one procedure on the memory device.

16. The method of claim 14, wherein the host device is arranged to send a device-side program code regarding the MP initialization of the memory device to the memory controller, for being loaded onto the RAM within the memory controller, wherein the device-side program code comprises the at least one procedure.

17. The method of claim 14, wherein the first procedure represents an eFuse handling procedure for preparing and storing the protected eFuse data.

18. The method of claim 14, wherein operations of another procedure among the at least one procedure comprises:
    storing at least one in-system programming (ISP) code from the host device into the NV memory, for being loaded onto the RAM in the user phase of the memory device to provide at least one corresponding function of the memory device.

19. The host device that operates according to the method of claim 14.

20. A computer-readable medium storing a program code which causes the host device to operate according to the method of claim 14 when executed by the host device.

\* \* \* \* \*